United States Patent [19]
Gini

[11] Patent Number: 6,123,536
[45] Date of Patent: Sep. 26, 2000

[54] PLANT FOR THE PRODUCTION OF PLASTIC TUBULAR FILMS WITH A BIAXIAL ORIENTATION AND AN IN-LINE STABILIZATION PHASE

[75] Inventor: Claudio Gini, Oleggio, Italy

[73] Assignee: Tecno Coating Engineering S.R.L., Marani Ticino, Italy

[21] Appl. No.: 09/031,539

[22] Filed: Feb. 27, 1998

[30] Foreign Application Priority Data

Apr. 24, 1997 [IT] Italy .................................. MI97A0977

[51] Int. Cl.⁷ .................................................. B29D 23/00
[52] U.S. Cl. ..................... 425/326.1; 425/392; 425/72.1; 425/387.1; 264/40.1
[58] Field of Search .................. 425/326.1, 392, 425/72.1, 387.1; 264/40.1

[56] References Cited

U.S. PATENT DOCUMENTS

| | | | |
|---|---|---|---|
| 3,960,997 | 6/1976 | Sorenson | 264/40 |
| 4,355,966 | 10/1982 | Sweeney et al. | 425/140 |
| 4,978,484 | 12/1990 | Takashige et al. | 264/40.1 |
| 5,046,936 | 9/1991 | Bourdiol et al. | 425/72.1 |
| 5,589,561 | 12/1996 | Barry et al. | 526/348.1 |

*Primary Examiner*—Harold Pyon
*Assistant Examiner*—Joseph S. Del Sole
*Attorney, Agent, or Firm*—Young & Thompson

[57] ABSTRACT

A plant for the production of plastic tubular films with a biaxial orientation, includes one or more extruders to feed the molten polymer to an extrusion head; an annular draw-plate for extruding a tube; an orientation station in which the tube is heated, expanded by an air bubble and simultaneously stretched in an axial direction. Elements are provided, for compensating the volume of inflation air so as to maintain a constant pressure inside the tube during the orienting process. To this end at least one of the pairs of rollers that feed and pick-up the tube is mobile in a direction parallel to the axis of the tube, and elements are provided to command the shifting of the pair of rollers depending on the diameter of the tube measured during the orienting phase.

4 Claims, 3 Drawing Sheets

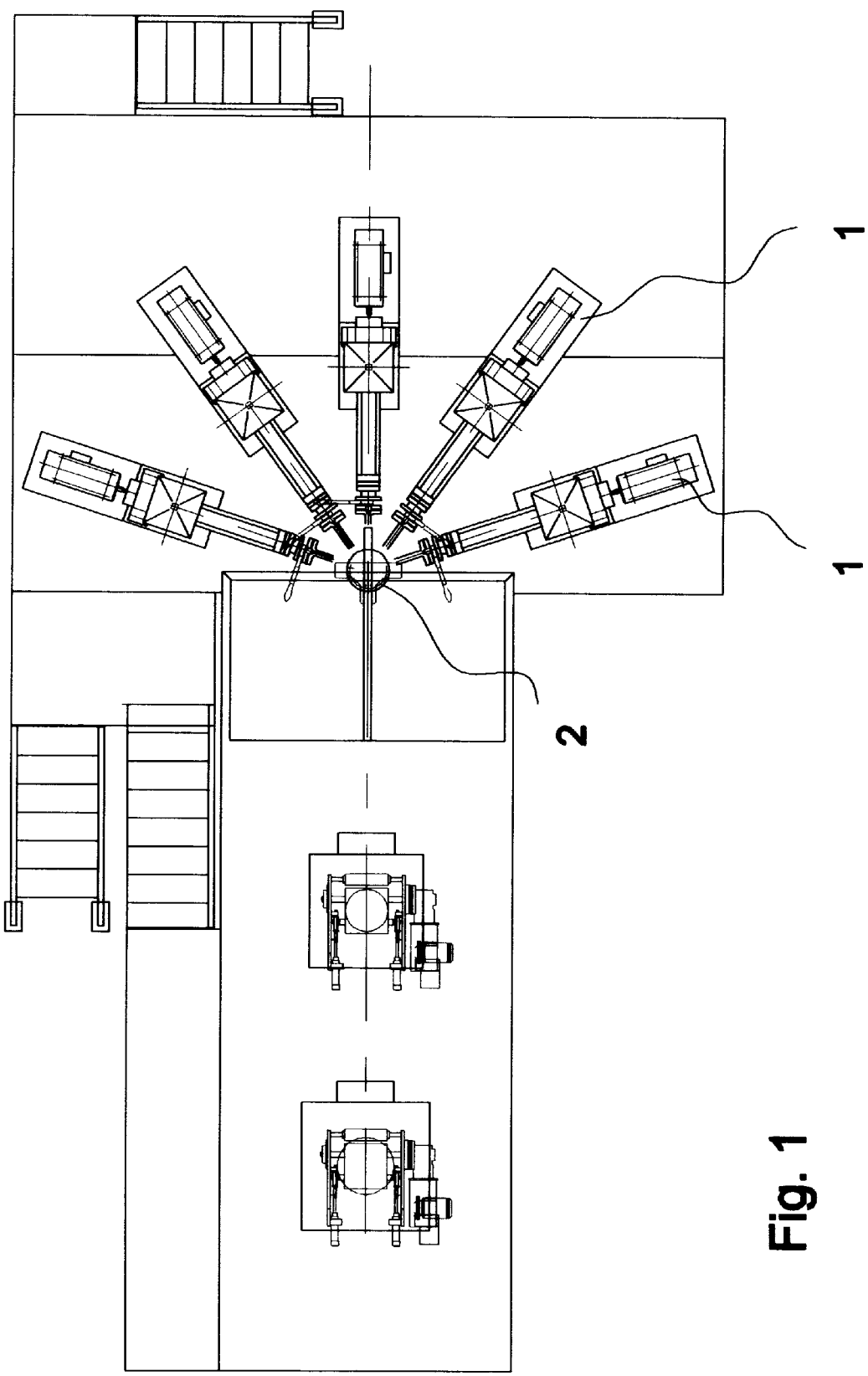

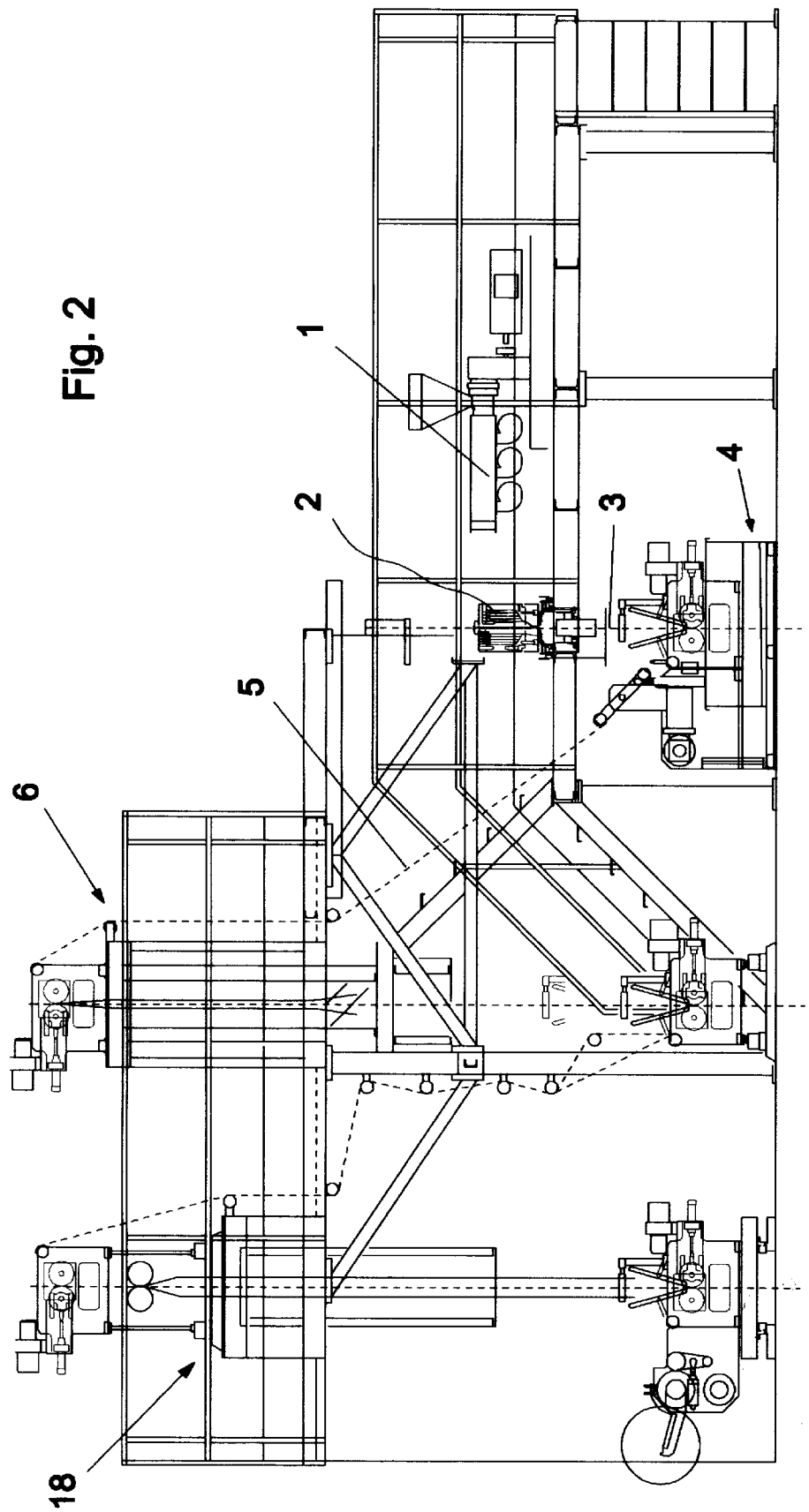

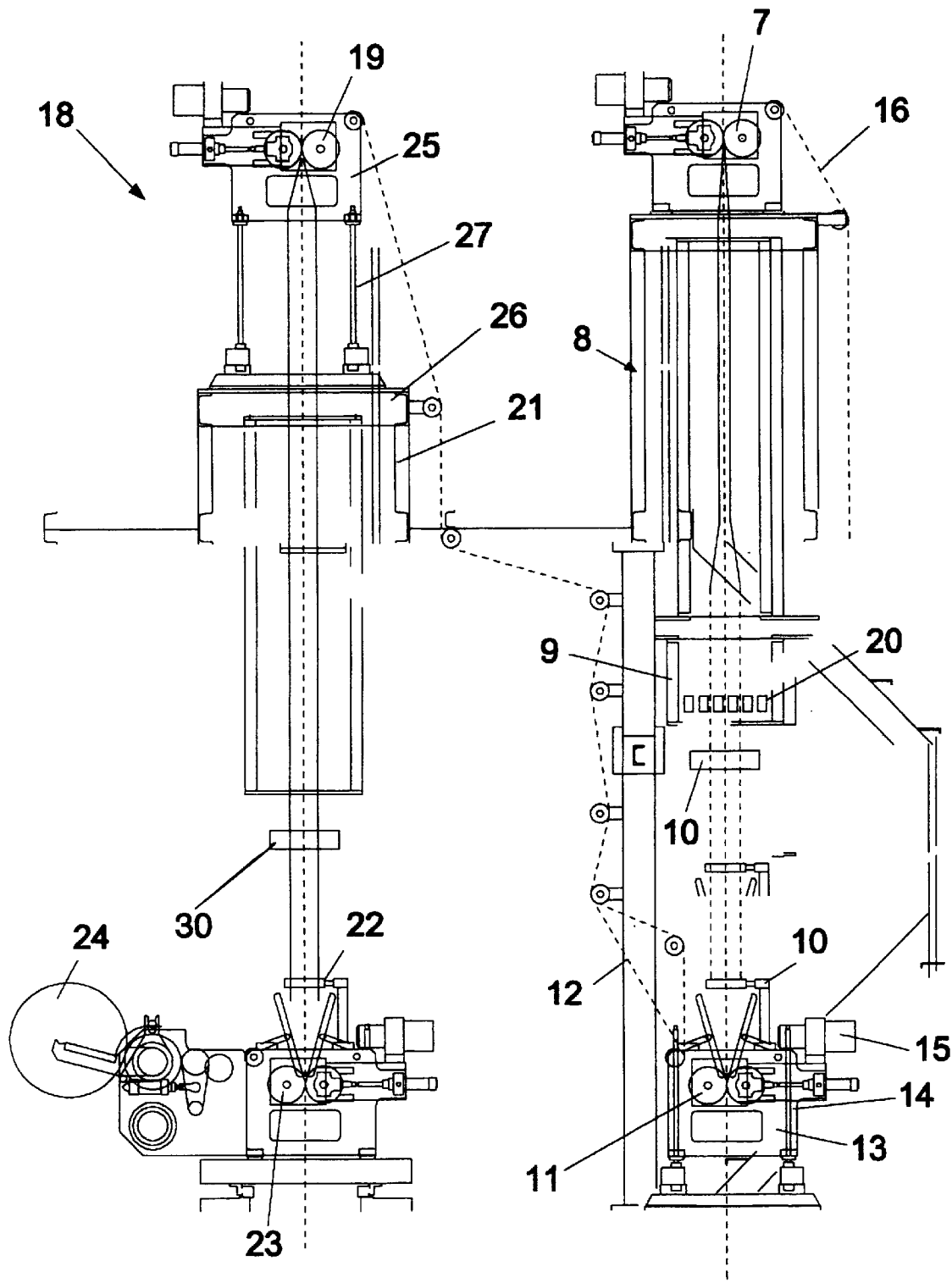

PLANT FOR THE PRODUCTION OF PLASTIC TUBULAR FILMS WITH A BIAXIAL ORIENTATION AND AN IN-LINE STABILIZATION PHASE

FIELD OF THE INVENTION

This invention proposes a plant for the production of plastic tubular films with a biaxial orientation and a stabilization section, in which the tube is subjected to a heating phase of the oriented tube and blown up with an air bubble at constant pressure, to determine its diameter and thermal stability as a result of the heat treatment.

According to one aspect of the invention, the plant provides an in-line stabilization section so as to allow the production of the tube by a continuous process and obtain a finished product at the plant outlet.

According to another aspect of the invention, the plant includes means capable of changing the positioning of the tube squashing rollers, which determine the length and consequently the diameter of the air bubble, so as to compensate for any variations in the quantity of air forming the bubble, and thus maintain a constant stretching size.

Thanks to these characteristics, the plant according to the invention allows to totally automatise the production cycle of this type of tubes, thus obtaining a finished product at the outlet which does not require any further processing.

BACKGROUND OF THE INVENTION

The known plants for the production of extruded tubular films generally comprise an extrusion head, from which the molten plastic material exits through an annular gap, thus forming a tube which is then subjected to a stretching action to achieve the material's orientation in two directions.

The longitudinal orientation of the material is achieved by traction rollers which advance the material at a speed superior to that at which ii exits the drawplate, while the transversal orientation is attained by inflating the tube.

This orienting operation endows the material with the thermal retracting capability needed to control it with precision. A known process in this regard is that of exposing an already oriented tube to a further stabilizing process which includes reheating and inflating the tube to a pre-established diameter and subsequently cooling it in a cooling chamber containing a calibrating device capable of determining the finished diameter of the oriented and stabilized tube.

The individual devices used for these operations are in themselves known, and a detailed description is therefore unnecessary.

A typical plant for the production of bidirectionally oriented tube generally includes the following equipment:
one or more extruders injecting the molten materials in an extruding device;
an extrusion head in which one or several layers of material is conveyed under controlled pressure and temperature conditions to an interchangeable drawplate from which it exits through a calibrated annular gap to pass into a cooling section;
an orienting section comprising a pair of inlet traction rollers, an oven for heating the tube, devices capable of inducing the expansion of the tube inside the oven, a cooling chamber and outlet traction rollers for a longitudinal stretching of the tube.
All these equipment items are controlled by electronic systems, also of a known type, which act on various parameters such as temperature, pressure, extrusion speed and tube traction speed, so as to achieve the desired result. At the present state of the art, the tube thus produced is subjected to a stabilization stage in a separate plant, which also comprises a pair of tube feeding rollers, a tube heating oven, means capable of inducing an inflation of the tube and a cooling section equipped with a calibrator which determines the diameter of the finished tube.

At present, therefore, the tube is produced in two stages, which provide means for an extrusion and stretching of the tube and its subsequent stabilization, respectively. This involves a waste of space and a lenghtening of the processing times, because the produced and oriented tube must be collected in spools, inserted into the stabilizing plant, and collected as a finished product at the outlet.

In the known plants the transversal stretching process, both in the extruding and in the stabilizing stage, is carried out by pumping up the tube with a predetermined volume of air, so as to induce its expansion to the desired degree.

This air therefore determines a sort of bubble limited at its extremities by the tube's pair of feeding and traction rollers, producing a configuration in which the tube in fact flows around this air bubble trapped in its interior between the two pairs of rollers.

This solution, while effective, is still not free of shortcomings, as it is practically impossible to prevent some of the air from escaping while the tube is passing through the rollers.

As a consequence of all this, the pressure inducing the expansion of the tube keeps dropping, albeit slowly, while the processing proceeds. This makes it necessary to periodically stop the plant and reintroduce an adequate amount of air into the tube to reestablish the conditions envisioned to induce the required expansion.

SUMMARY OF THE INVENTION

The difficulties described above are now resolved by this invention, which proposes a plant for the production of plastic tubular films with a biaxial orientation comprising the stabilizing equipment in an in-line arrangement, so as to attain a finished product at the outlet without any need for further operations, and which includes means capable of changing the position of the pairs of rollers which limit the air bubble inside the tubular, so as to compensate any losses while maintaining a constant pressure inside the tubular and the diameter achieved by the same.

These and other purposes are achieved by a plant in accordance with the characterization given in the attached claims.

BRIEF DESCRIPTION OF THE DRAWINGS

The invention will now be described in detail, as a non-limiting example, by referring to the attached drawings, where:

FIG. 1 is a simplified ground view of a plant according to the invention;

FIG. 2 is the simplified side view of the plant in FIG. 1;

The FIGS. 3 and 4 are the simplified side views of the orienting and the stabilizing sections, respectively, of the stabilization section in a plant according to the invention.

DETAILED DESCRIPTION OF THE INVENTION

With reference to the FIGS. 1 and 2, the number 1 indicates a multiple number of injectors which direct the molten plastic material to an extrusion head 2 equipped with an annular drawplate extruding a tube 3, which goes to a cooling vat identified in its overall form by the number 4.

The extrusion head is of a known type, as described for example in the patent application MI 97A 0561 by the same patent holder, to which we refer for further details.

At the outlet of the cooling vat the tube is squashed by a couple of rollers and the flattened film, shown by the number 5, is conveyed to an orienting complex, shown in its overall form by the number 6.

This complex, as seen in greater detail in FIG. 3, comprises a pair of feeding rollers 7, which feed the tube, while still in a squashed form, to a preheating station 8, from which the tube moves to an orienting oven indicated by the number 9.

This oven is composed of an essentially cylindrical chamber whose walls hold the means for generating infrared rays, for instance a multitude of lamps or similar, which further heat the tube.

A cooling chamber 10 is provided downstream of the orienting station. At the outlet of this chamber a pair of traction rollers again squash the tube, which exits this station in the form of a flattened film indicated by the number 12.

In the area between the feeding rollers 7 and the traction rollers 11 an air bubble is injected into the tube at certain pressure conditions, which inflates the tube when the same is heated in the chamber 9 and orients it transversally. The longitudinal orientation is on the other hand obtained by rotating the rollers 11 at a speed exceeding that of the rollers 7, so as to stretch the material in a longitudinal direction, by which we mean a direction along the axis of the tube itself.

The characteristic of the invention is that it supplies at least the feeding rollers 7 or the traction rollers 11 mounted on a structure which can translate in a direction parallel to that of the advancing tube.

In the specific case illustrated in the Figure the traction rollers 11 are mounted on a frame 13 which is in turn mounted on threaded shafts 14 which may be rotated around their axes by a motor 15.

Rotating the shafts 14 in one sense or the other thus makes it possible to lift or lower the traction rollers 11 to compensate for certain changes in the volume of the air bubble contained in the tube, so as to maintain a constant pressure in the latter.

Some sensors of a known type 20 are arranged opposite the oven to verify the diameter of the tube, and based on the resulting values to act on the motor 15 to command the lifting or lowering of the rollers 11 so as to vary the air pressure inside the tube and thus make it possible to maintain the width of the same inside the oven 9, and thereby its transversal orientation, at a constant value.

A further characteristic of the invention is constituted by the presence, immediately downstream of the orientation section just described, of a second stabilization section indicated by the number 18 and illustrated in FIG. 4.

An oriented tube, shaped into a flattened strip 12, arrives at a pair of feeding rollers 19, to subsequently enter a heating station 21 where it is again expanded by means of an air bubble, to finally attain a cooling station 22 and a pair of traction rollers 23, which turn at the same speed as that of the rollers 19 and squash the tube, which is finally wrapped on a spinning wheel 24.

In the station 21 the tube is after heating allowed to contract to a predetermined diameter, so a to confer it a proper degree of residual thermal retractability.

A cooling station 30 is provided downstream of this station.

The frame 25 of the feeding rollers 19 is mounted on the structure 26 of the plant itself by four threaded shafts 27 which may be rotated, just as the similar device for the orienting station, to lift and lower the frame 25 and rollers 19, so as to compensate any air losses and to maintain a constant pressure inside the tube, and therefore its constant diameter.

During the operation of the plant the polymer, for instance in a granular form, is fed to the extruders 1 which convey it to the extrusion head 2 which produces at its outlet a tube immediately subjected to cooling by water in the cooling station 4. This tube is flattened by a first pair of rollers and the film thus obtained moves to the orienting station 6 where it is heated in the oven and thus oriented.

The transversal orientation is obtained during the transition phase of the tube diameter, which gradually inflates under the effect of pressure and of its internal air bubble as the material is heated, while the longitudinal orientation is achieved at the same time by stretching the tube by the traction rollers 11, while running at a speed exceeding the inlet speed.

During this orienting phase the sensors installed in the plant constantly gauge the diameter of the tube, and when the latter tends to diminish because part of the inflating air escapes, generate a signal that triggers the motion of the motor 15, which rotates the threaded shafts 14 and thereby lifts the assembly holding the traction rollers 11 so as to slightly reduce the length of the bubble and thereby compensate the diameter of the tube during the phase of orienting it to the expected value.

The tube is then cooled by jetting it with air in the station 10, squashed by the traction rollers 11 and conveyed in the form of a thin flat film 12 to the stabilizing section 18.

At this point the tube is once again heated in the oven 21, and at the exit cooled and wrapped on the collecting devices.

The stabilizing station is also equipped with a system to shift the pair of rollers, in this specific case the feeding rollers 19, to compensate for the eventual air escaping the tube.

The plant described above allows, thanks to the described characteristics, a continuous production of a biaxially oriented and stabilized tube, affording an effective and continuous control of the operating conditions and therefore of the final result.

An expert in the trade may provide numerous changes and variants, which shall all have to be considered as falling within the scope of this invention.

What is claimed is:

1. A plant for the production of plastic tubular films with a biaxial orientation, which comprises in series:

an extrusion station, an orientation station and a stabilization station;

the extrusion station comprising at least one extruder for feeding molten polymer to an extrusion head;

said extrusion head being equipped with an annular drawplate for extruding a tube;

the orientation station comprising a pair of feeding rollers for feeding the tube to a heating zone;

air injection means, positioned downstream of the pair of feeding rollers, for injecting an air bubble into the tube so as to expand and simultaneously stretch said tube in an axial direction;

means for compensating the volume of injected air so as to maintain a constant pressure inside the tube;

a pair of traction rollers positioned downstream of said heating zone for squashing the stretched tube into a flattened film, and delivering said flattened film to the stabilization station;

at least one of said pair of rollers being mobile in a direction parallel to the axis of the tube;

said pair of traction rollers being mounted on a series of threaded shafts parallel to the direction of forward motion of the tube;

sensor means for measuring the diameter of the tube and for controlling rotation of the threaded shafts in response to a signal generated by said sensor means;

the stabilization station comprising a pair of feed rollers for feeding the flattened film to a heating station;

air injector means, positioned downstream of said pair of feed rollers, for injecting air into the film;

a pair of traction rollers positioned downstream of said heating station for squashing the flattened film; and shifting means for moving at least one of the pair of feed or traction rollers in said stabilization station, along the longitudinal axis of the flattened film so as to compensate for changes of air volume contained inside the film.

2. The plant according to claim 1, wherein the stabilization zone further comprises a cooling station positioned downstream of said heating station and upstream of said pair of traction rollers.

3. The plant according to claim 1, wherein the shifting means move the pair of feed rollers along the longitudinal axis of the flattened film.

4. The plant according to claim 1, further comprising a spinning wheel for wrapping the flattened film exiting the stabilization station.

* * * * *